United States Patent

Sorokin

[15] 3,679,995

[45] July 25, 1972

[54] OPTICALLY PUMPED LIQUID LASERS

[72] Inventor: Peter P. Sorokin, Ossining, N.Y.

[73] Assignee: International Business Machines Corporation, Armonk, N.Y.

[22] Filed: March 11, 1970

[21] Appl. No.: 18,001

Related U.S. Application Data

[63] Continuation-in-part of Ser. No. 532,182, March 7, 1966, abandoned.

[52] U.S. Cl..............................................331/94.5, 330/4.3
[51] Int. Cl..........................................................H01s 3/20
[58] Field of Search.................331/94.5; 252/301.3; 330/4.3

[56] References Cited

UNITED STATES PATENTS 2,734,900   2/1956   Heseltine............................350/160 P

OTHER PUBLICATIONS

Stockman et al., Stimulated Emission in Aromatic Organic Compounds, Proc. IEEE, Vol. 52, No. 3 (March 1964) pp. 318 & 319.

Sorokin et al., Ruby Laser Q–Switching Elements Using Phthalocyanine Molecules in Solution, IBM J. of R & D, Vol. 8, No. 2 (April 1964) pp. 182– 184.

Soffer et al., Generation of Giant Pulses from a Neodymium Laser by a Reversibly Bleachable Absorber, Nature, Vol. 204, No. 4955 (Oct. 17, 1964) p. 276.

*Primary Examiner*—William L. Sikes
*Attorney*—Hanifin and Jancin and George Baron

[57] ABSTRACT

An optically pumped organic laser using materials having allowed electric dipole fluorescent transitions. These materials include photosensitizing dyes. The active fluorescent materials are pumped with either a laser pulse or a flashlamp pulse, the pumping pulse having a risetime not exceeding a few times the decay time between the first excited singlet state and a triplet state of the fluorescent material.

24 Claims, 8 Drawing Figures

INVENTOR
PETER P. SOROKIN

BY *George Baron*

ATTORNEY

GIANT PULSE RUBY LASER — DTTC LASER

MIRROR TRANSMITS 1% AT .694μ (RUBY)

TRANSMITS 60% AT .694μ 1% AT .861μ (DTTC)

TRANSMITS 25% AT .816μ

TRIPLET STATE T

PUMPING FREQUENCY AT 6943Å

OUTPUT FREQUENCY $\nu \sim 0.78\mu - 0.86\mu$

7570 Å

RUBY OUTPUT

ABSORPTIVITY

WAVELENGTH

DTTC IODIDE OUTPUT FOR LOW DYE CONCENTRATIONS

FLUORESCENCE

WAVELENGTH

OPTICALLY PUMPED LIQUID LASERS

This application is a continuation in part of application Ser. No. 532,182, filed Mar. 7, 1966 and now abandoned, the latter being assigned to the assignee of the present invention.

This invention relates to the generation of laser beams in general and, more particularly, to the use of a fluid organic solution as a laser material.

The invention disclosed in the parent case was conceived in terms of obtaining a laser device wherein the active medium is a fluorescent organic material having an allowed electric dipole fluorescent transition. Such medium was pumped with the output of a laser; in effect, one obtained a laser-pumped-laser. The present invention extends the teaching of the parent case to include photosensitizing dyes. Examples of types of photosensitizing dyes that can be laser-pumped to produce lasing are set out on pp. 41–46 of a catalogue No. 5 entitled "Organic and Inorganic Research Chemicals" that was issued in Jan. 1965 by Gallard-Schlesinger Chemical Manufacturing Corporation of 580 Mineola Avenue, Carle Place, Long Island. While not all such dyes have been tried, one particular one has proved to be capable of being pumped by a giant pulse ruby laser, namely, 3-3' - diethylthiatricarbocyanine iodide (abbreviated DTTC iodide hereinafter). The use of a photosensitizing dye as a lasing material further supports the invention of the parent case wherein allowed electric dipole transitions are used not only for pumping, but also for lasing. Photosensitizing dyes, while they behave substantially as the organic molecules disclosed in the parent case, additionally do not contain any metal ions.

Fluid state lasers have previously been achieved with a select group of metallo-organic compounds called rare earth chelates. See article by A. Lempicki et al, p. 205, Applied Optics (Supplement 2 on Chemical Lasers) 1965, published by Optical Society of America, Washington, D. C. In the chelates, the central metal (a rare earth, such as europium) ion is attached to a number of organic ligands. The organic group absorbs energy over a wide band and transfers the excitation due to such absorption to the metal ion. Such transfer of energy results in population inversion needed for obtaining stimulated emission phenomenon. However, it is actually the transitions of the rare earth ions that produce the lasing in such compounds. The early chelate lasers were operated at low temperatures involving a rigid glass matrix formed by freezing various alcoholic solutions. Recently (see "Applied Physics Letters" 5, p. 173 (1964) by Samelson et al) room temperature operation of chelate lasers has been reported.

Morantz et al, in the "Physical Review Letters" 8, p. 23, (1962), reported stimulated emission from an optically pumped rigid glass matrix solvent containing organic molecules. Such stimulated emission was alleged to have been obtained in the spin-forbidden triplet-singlet transitions. But it is highly doubtful that such transitions could have taken place because calculations have been made which indicate that the required population inversion needed for lasing in the systems they describe far exceeds the density of active molecules present in the solutions named in such Morantz et al article.

Consequently, it is an object of this invention to attain a novel organic laser.

It is yet another object to attain an organic laser wherein the basic organic compound is a metal porphyrin dissolved in an organic or inorganic solvent.

Yet another object is to attain a laser wherein the preferred active medium is a solution of chloro-aluminum phthalocyanine dissolved in ethyl alcohol.

It is yet another object to obtain a liquid laser.

It is a further object to obtain a laser comprising an organic compound in a host medium.

Yet another object is to attain a laser wherein the preferred active medium is a solution of chloro-aluminum phthalocyanine.

Yet another object is to attain an optically pumped liquid laser wherein said liquid is a solution of a photosensitizing dye.

Yet another object is to attain an end-pumped optical maser containing such photosensitizing dye as the lasing medium.

The foregoing and other objects, features and advantages of the invention will be apparent from the following more particular description of preferred embodiments of the invention, as illustrated in the accompanying drawings.

Figure 1:
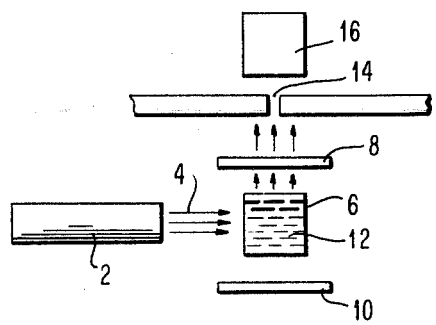
FIG. 1 is a schematic diagram of the liquid laser system.

In FIG. 1, a ruby laser 2 emits a giant or intense pulse 4 of light having a wave length of 6943A. and an intensity in the range of 1–100 megawatts/cm$^2$. A laser capable of such emission is described in detail in applicant's copending application for a "Giant Pulse Laser," Ser. No. 350,397, filed Mar. 9, 1964. Such pulse 4 is directed at a glass cell 6, the latter being a cylinder one inch in length and ¾ inch in diameter. Parallel mirrors 8 and 10 comprise the optical feedback means of the lasing cavity that includes an organic solution such as a phthalocyanine dye 12 in glass cell 6. Mirrors 8 and 10 are treated by conventional coating techniques so that they are highly reflecting and a few per cent transmitting for the wave length corresponding to 7560A. Adjacent to mirror 8 is a spectrograph slit 14 through which the lasing beam output frequency of 7560A. passes on its way to being recorded on the film of a spectrograph designated symbolically as 16. Representative values for the mirrors 8 and 10 are 92–98 percent reflective and 8–2 percent transmissive.

In the practice of the present invention, cell 6 is filled with an organic compound or dye from the generic family of metal porphyrins. The term "porphyrin" is used to denote all tetrapyrrole compounds in which the rings are linked in a closed conjugate system. The class of compounds includes the porphyrins, the reduced porphyrins, and the benzoporphyrins. Although such class of porphyrins will produce laser outputs of different wave lengths, depending upon the specific metal porphyrin used, one example of a porphyrin that has produced a sharp output at 7560A. is a room temperature solution of chloro-aluminum phthalocyanine dissolved in ethyl alcohol (phthalocyanine concentration range approximately from $5 \times 10^6$ to $2 \times 10^{17}$ molecules per cubic centimeter).

Figure 2:
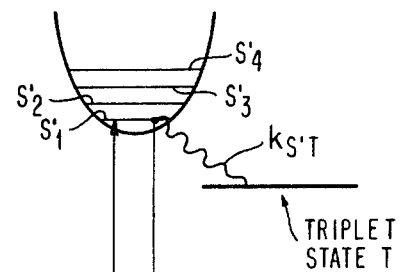
FIG. 2 is an energy level diagram useful in understanding the operation of the present invention.
Figure 3:
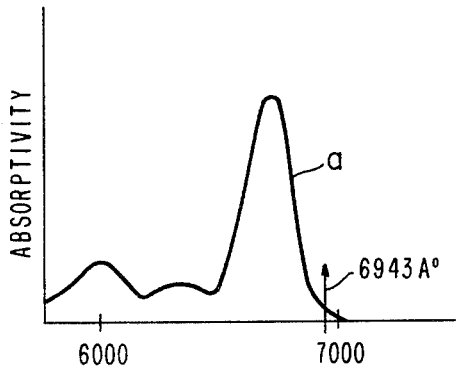
FIG. 3 is an absorptivity versus wave-length plot.
Figure 4:
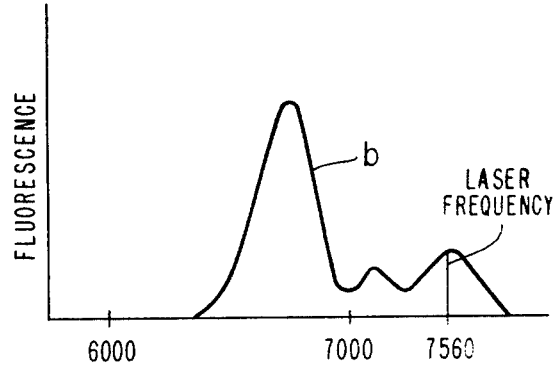
FIG. 4 is a fluorescence versus wave-length plot.

FIGS. 2, 3, and 4 will now be considered in conjunction with FIG. 1 to explain the operation of an organic laser. Cell 6 is filled with the selected organic compound, i.e., chloro-aluminum phthalocyanine dissolved in ethyl alcohol, and placed between parallel mirrors 8 and 10. Ruby laser 2 is pulsed to produce an intense laser beam having the characteristic frequency of 6943A. and an output intensity of at least one megawatt/cm$^2$. After pulsing of the ruby laser, the spectroscope plate of spectrograph 16 shows a sharply defined output, from the lasing cavity that includes cell 6, that has a wave length of 7560A. It is believed that the following takes place.

The ruby beam 4, whose output frequency is 6943A, is on the wing of the absorption curve $a$ and impinges on the phthalocyanine dye 12 contained in cell 6 so as to pump the phthalocyanine molecules to the excited state $S_1'$ (see FIG. 2). In FIG. 2, the various vibrational ground state energy levels are indicated as $S_1$, $S_2$, $S_3$, and $S_4$. The various vibrational levels of the first excited singlet state are indicated as $S'_1$, $S'_2$, $S'_3$, and $S'_4$. When a sufficient inversion of the molecules between $S'_1$ and an excited vibrational level of the ground state occurs, stimulated emission occurs. For chloroaluminum phthalocyanine in ethyl alcohol, the transition frequency happens to be 7560A. It is noted that transitions between the $S'_1$ state and the triplet state T have the (desired) low probability of occurrence when the central metal ion in the phthalocyanine molecule is a light diamagnetic ion. Such is the case when the choice of the lasing dye is chloro-aluminum phthalocyanine. In general, the transition at the lasing frequency is from the first excited vibrational-rotational band $S'_1$ to an excited vibrational level of the ground electronic state. It is understood that one need not have an organic solvent for the lasing organic molecule. Inorganic solvents, such as concentrated (anhydrous) $H_2SO_4$, are also suitable. Also, the liquid solvent may be generalized to include glassy solids.

The inversion density required to support lasing of the liquid phthalocyanine, as well as the minimum pumping power which must be supplied per unit volume to keep the system on the threshold of oscillation, can be calculated in the following manner. Assuming a Lorentzian line shape, $$\frac{N\text{th}}{V} = \frac{8\pi^2 \tau \Delta\nu (1-R) n_r^2}{\lambda^2 l\phi} \quad (1)$$

where $N\text{th}/V$ represents the number of ions per unit volume in the inverted state, $l$ = the length of the active medium, $\phi$ = the fraction of fluorescence in the desired (lasing) band, $\lambda$ = the wave length of the lasing band, $\tau$ = observed lifetime of fluorescence, $\Delta\nu$ = half-width of the lasing band, $n_r$ = index of refraction of the lasing material and $R$ = reflectivity of the end mirrors of the lasing cavity.

Formula (1) above assumes that a photon of energy that is absorbed will decay by fluorescence, i.e., unity fluorescent quantum efficiency. For the phthalocyanine with light diamagnetic central metal ions, or free base phthalocyanines, such assumption is approximately true. It is known that the quantum efficiency of the Mg-phthalocyanine is about 80 percent at 300° C. The data to be substituted in equation (1), while it is known to apply to Mg-phthalocyanine, also applies, with minor exceptions, to chloro-aluminum phthalocyanine dissolved in ethyl alcohol If $\phi=1/10$, $l=2.5$ cm., $\Delta\nu=200$ cm$^{-1}$, $\tau=7.9 \times 10^9$ seconds and $R=0.95$, formula (1) becomes $$\frac{N\text{th}}{V} = \frac{8\pi^2 (7.9 \times 10^{-9}) (200 \times 3 \times 10^{10}) (0.05) (1.5)}{(0.75 \times 10^{-4})^2 (2.5) (0.1)}$$

$$\approx \frac{3.2 \times 10^{14}}{\text{cm}^3}$$

To maintain this inversion of $(3.2 \times 10^{14}\text{ions})/\text{cm}^3$ requires a minimum absorbed pumping power of approximately 100 kilowatts./cm$^3$ a requirement that is easily met by a giant pulse ruby laser.

As seen in FIG. 3, the ruby beam frequency of 6943A. is in the wing of the absorption curve $a$ and such beam pumps the phthalocyanine molecules to state $S'_1$. The curve $b$ of FIG. 4 represents the general fluorescence curve of the phthalocyanine dye. Such fluorescent light is incoherent as distinct from the lasing beam that is coherent and directional.

The invention can be extended to cover liquids or organic molecules other than the metal porphyrins, and the excitation energy could be other than a ruby laser.

Instead of the ruby laser 2 as an exciting source, one can use all singlet-singlet pumping bands to effectively populate the lowest vibrational level of the excited singlet state if the pumping light employed is intense enough (one must be able to extract from the pumping beam at least 100 kilowatts/cm$^3$ in the case of chloro-aluminum phthalocyanine and if each mirror 8 and 10 has a reflectivity of 0.95 and the length of the cell containing the active amplifying medium is 2.5 cm. Less pumping power per unit volume is needed if a longer length l for the active medium 12 is used or if the mirror reflectivity is higher, as is seen from the above-noted formula 1) and has a very short rise time, namely, no longer than a few times the mean decay time, $1/k_{S'T}$ of the first excited singlet state to the triplet state. The latter mean decay time is approximately 100 nanoseconds for chloro-aluminum phthalocyanine. The decay time $1/k_{S'T}$ is the reciprocal of the rate constant $k$, namely, the number of inverted ions per second that go from the first vibrational level $S_1'$ to the triplet state T.

The above noted minimum pumping intensities and pulse rise times will vary with the particular organic compound employed as the lasing material within cell 6. In the case of the porphyrins, the rate constant $k_{S'T}$ depends on the central metal ion embodied in the particular molecule to be excited. In organic molecules not of the metallo-organic variety, other factors will determine $k_{S'T}$.

If the above two conditions, namely, minimum pulsing energy and fast rise times are observed, a wide range of fluorescent organic molecules can be used. Thus the ruby laser 2 can be replaced by a flash lamp or any other light source provided, as noted above, such flash lamp or its equivalent emits the minimum intensity of light discussed above and has a sufficiently fast rise time. Where an organic compound is employed having no central metal ion, the same criterion is required, namely, that the rise time of the pumping pulse be no longer than a few times the decay time from the first excited state $S_1'$ to the triplet state T.

Figure 5:
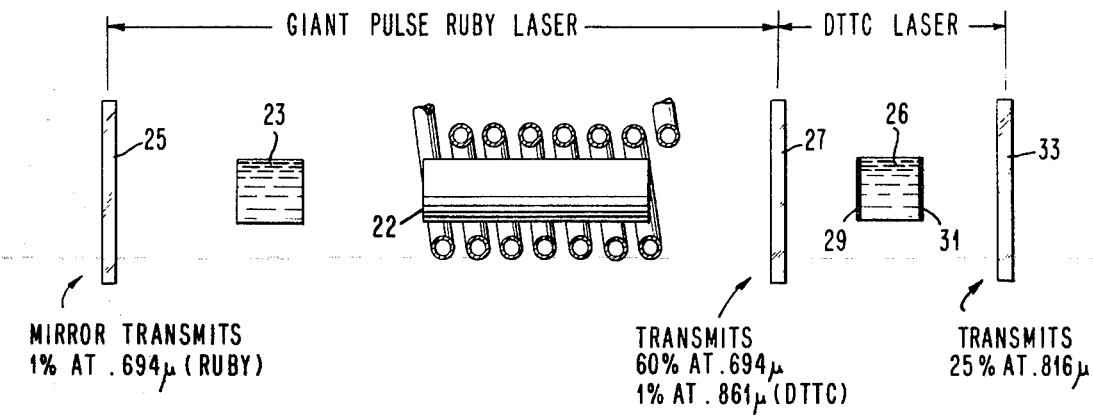
FIG. 5 is a showing of an optically pumped organic laser using the principle of end-pumping of a laser.

One can also obtain lasing by employing DTTC iodide as a replacement for the chloro-aluminum phthalocyanine dye or other organic lasing material 6 used in FIG. 1. However, in order to obtain a more intense output from the lasing dye, the "end-pumping" configuration of FIG. 5 was used instead of that shown in FIG. 1. It is acknowledged that end-pumping is known in the prior art and it is not suggested herein that such technique is novel. A ruby laser rod 22 is aligned with a Q-switching element 23, such as a solution of a bleachable dye such as vanadyl phthalocyanine, between mirrors 25 and 27. Mirror 25 is about 99 percent reflective at a wave length of 0.69$\mu$. Mirror 27 is 60 percent transmissive at 0.69$\mu$ and 99 percent reflective at 0.81$\mu$. The glass container 26 is a 1 inch long cylinder having a diameter of ¾ inch and is of high optical quality, including conventional anti-reflection coatings 29 and 31 at each end of the cylinder 26. A solution of DTTC iodide, dissolved in any of the following solvents, namely, dimethyl sulfoxide, ethyl alcohol, methyl alcohol, 1-propanol, dimethyl formamide, acetone, butyl alcohol, glycerine and ethylene glycol, is poured into container 26.

The DTTC iodide solution was initially made about 30 percent transmitting at 0.69$\mu$ over a 1 inch path. Later experimentation showed that DTTC dye concentrations having low-level 0.69$\mu$ transmission, I/I$_o$ (where I is the output intensity and I$_o$ is the input intensity) anywhere in the range 0.9 to $10^{-25}$ could be made to lase satisfactorily in the apparatus shown in FIG. 5. The intensity of the DTTC iodide lasing beam did not vary by more than a factor two over the above concentration range. The center of the stimulated emission band shifted by some 600 angstroms over this same range. By employing a different dye concentration, one obtains a different frequency output from the DTTC iodide laser. Thus, the laser of this invention can be tuned. Different solvents also provide frequency shifts in the laser output, allowing for tuning. Mirror 33 is 15 percent transmissive at 0.69$\mu$ and 75 percent reflective at 0.81$\mu$.

In effect, two lasing cavities were provided, as in FIG. 1, but because of the end-pumping technique relied upon, mirror 27 was common to both cavities. The giant pulse ruby laser was 60 cm. long and the DTTC iodide laser was 22 cm. in length. The ruby laser supplied pumping energy to the DTTC iodide solution endwise rather than edgewise as shown in FIG. 1. Using different solvents and concentrations, DTTC iodide laser outputs were obtained in the range 0.78$\mu$ – 0 86$\mu$.

Using various other photosensitizing dyes in the practice of this invention, giant pulse laser beams can be obtained in the spectral region between 0.7$\mu$ and 1.5$\mu$. When the laser system of FIG. 5 was fired, using a DTTC iodide methyl alcohol solution transmitting at 0.6$\mu$, 40 percent in a 1 inch path length, a peak total output power of 0.63MW at 0.816$\mu$ was obtained. The output mirror 33 and cell 26 were removed and the peak output power of the ruby laser was measured alone. This value was 4.45 MW. Hence, the efficiency of the system was about 14 percent. Moreover, the system of FIG. 5 permits one to obtain an output giant pulse which has a beam divergence far smaller than that of a ruby laser alone. Far-field patterns were roughly compared by projecting the output towards a target and photographing the resulting spot. When the cell 26 and secondary cavity output mirror 33 were removed, the ruby beam illuminated a spot from which a 5 milliradian (half-angle) divergence was deduced. The area illuminated by the DTTC iodide laser at the same distance was but 6 percent as large. Resulting DTTC iodide beams were, therefore, about 2 ⅓ times as intense as that of the ruby beam alone.

Figure 6:
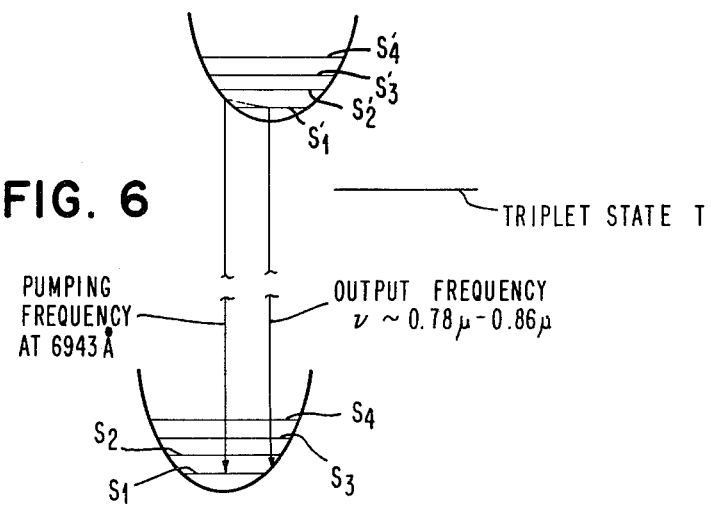
FIG. 6 is an energy level diagram similar to FIG. 2 but applies to the photosensitizing dye DTTC iodide.
Figure 7:
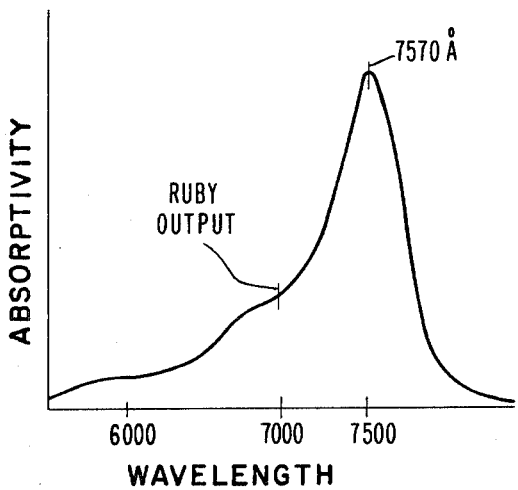
FIG. 7 is the absorptivity versus wave-length plot for DTTC iodide and FIG. 8 is a fluorescence versus wave-length plot of such dye.
Figure 8:
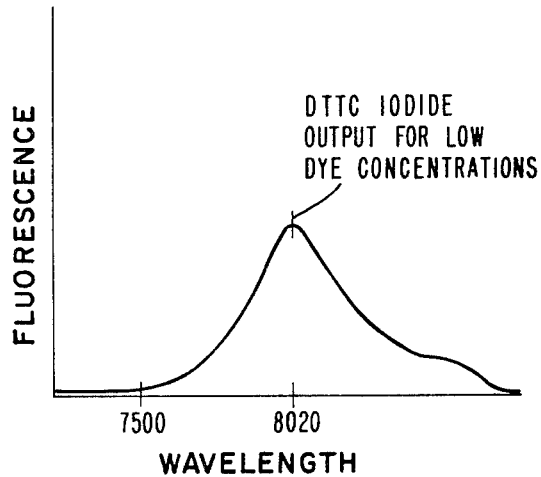

In the case of the DTTC iodide, the potential energy diagram of FIG. 6 applies. In contrast to the chloro-aluminum phthalocyanine potential energy diagram of FIG. 2, there is evidence of a Franck-Condon shift. That is, the equilibrium nuclear configurations of the ground and excited electronic states are different. This difference results in a displacement of the pick fluorescence (the output line of FIG. 6 having a frequency $v$) to longer wavelengths. In the lasing action of the DTTC iodide, ruby light is absorbed, pumping the molecules of the dye from the lowest vibrational-rotational band $S_1$ of the ground electronic state to levels in the vibrational-rotational bands $S'_1$ and $S'_2$ in the excited electronic state. Subsequent non-radiative transitions then carry all molecules to the lowest vibrational-rotational band $S_1'$. Simulated emission occurs in a transition from the band $S'_1$ to excited vibration levels of the vibrational-rotational band $S_1$. The Franck-Condon shift is helpful in that is shifts the output frequency from the region of maximum absorption (which is 7570 angstroms as seen in FIG. 7) so as to provide a favorable gain versus loss condition in the lasing cavity.

In the practice of this invention, excited singlet to triplet transitions are undesirable because such transitions deplete the population of the first vibrational level of the first excited singlet state $S_1'$ and, consequently, reduce the population inversion between this state and the various excited vibrational levels of the ground singlet state. Thus, those organic molecules are employed in this invention which support singlet-to-singlet transitions. In the case of the phthalocyanines, the allowed transitions are singlet-singlet (electric dipole) transitions of the conjugated ring of $\pi$ electrons. In DTTC iodide they are singlet-singlet (electric dipole) transitions of the conjugated chain of $\pi$ electrons.

Most organic molecules have strongly allowed transitions in the ultraviolet, some in the visible and others in the infrared. Such allowed transitions are most commonly singlet-singlet transitions. In rare instances, certain organic molecules, when pumped with a high intensity light pulse, will support triplet-to-triplet transitions, the latter transitions capable of providing laser outputs similar to the singlet-to-singlet transitions. Stated another way, it is desirable that the ratio of fluorescence to phosphorescence of the chosen organic molecule be as large as possible, i.e., $\phi_F/\phi_P >> 1$, where $\phi_F$ is the fluorescent quantum efficiency and $\phi_P$ is the phosphorescent quantum efficiency. It is also desirable that non-radiative transitions from the first vibrational level of the first excited singlet state be generally of low probability of occurrence.

Although it is known that the chelates are metal-organic compounds, allowed electric dipole transitions of the molecules of such class of compounds contribute only towards the pumping action of the laser material composed of such compound. In the class of organic compounds employed in the present invention, allowed electric dipole transitions are used not only for pumping, but also for lasing. In fact, the presence or absence of a metal ion in the parent organic compound is secondary, such metal ion only serving to influence the exact position of the allowed transition and its quantum efficiency. Such organic molecule will be fluorescent and have a high fluorescent quantum efficiency in the electric dipole transitions used for lasing.

It has been observed that the leading edges of the output pulses of the lasing organic molecules employed in the practice of this invention have exceedingly fast rise times. Such leading edges are highly desirable where subsequent amplification of the leading output pulse is desired. Fast rise times of an optical pulse are very useful in obtaining optical resolution. It is apparent that one can employ the high optical gain inherent in the pumped organic laser as described herein for the purposes of amplification of light as well as for the generation of light.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A device for producing coherent electromagnetic radiation comprising
    a resonant cavity,
    a fluorescent organic material disposed within said cavity and having an allowed electric dipole fluorescent transition, said organic material having ground state energy levels and energy levels of a first excited singlet state and of a triplet state, there being a mean decay time between said first excited singlet state and a triplet state,
    and means for exciting said organic material to produce said coherent electromagnetic radiation in said transition within said cavity, said means producing electro-magnetic radiation having a risetime less than a few times said decay time.

2. The device of claim 1 wherein said allowed electric dipole transition is a singlet-singlet transition.

3. The device of claim 1 wherein said means for exciting said organic material is light.

4. A laser comprising an active medium,
    said active medium comprising organic molecules capable of lasing in an allowed fluorescent transition when stimulated by radiation, and a source of stimulating radiation having a risetime not exceeding a few times the decay time between the first excited singlet state of said active medium and a triplet state of said active medium.

5. The invention as defined in claim 4 wherein the stimulated emission of the active medium takes place in a transition from the first excited singlet state to a vibrational level of the ground singlet state.

6. A laser comprising an active medium is an optical cavity, said active medium consisting of a metal porphyrin dissolved in a suitable solvent, and means for applying an excitation pulse to said active medium, said excitation pulse having a risetime less than a few times the mean decay time between the first excited singlet state and a triplet state of said active medium.

7. A laser as defined in claim 6 wherein said active medium is dissolved in an inorganic solvent.

8. A laser as set forth in claim 6 wherein said active medium is chloro-aluminum phthalocyanine dissolved in an organic solvent.

9. A laser as set forth in claim 8 wherein said solvent is ethyl alcohol.

10 A laser as defined in claim 6 wherein said solvent is concentrated $H_2SO_4$.

11. A laser comprising an active medium in an optical cavity, said active medium consisting of chloro-aluminum phthalocyanine dissolved in an organic solvent, means for applying a lasing pulse of a frequency of 6943A. and risetime not exceeding approximately a few times the decay time between the first excited singlet state and a triplet state of said active medium to said active medium, whereby said active medium lases at a frequency of about 7560A.

12. A laser as defined in claim 11 wherein said optical cavity comprises two parallel reflecting mirrors, one on either side of said active medium, one of said mirrors being partially transmissive to electromagnetic energy having a frequency of 7560A.

13. A device for producing coherent electromagnetic radiation comprising
    a resonant cavity,
    a fluorescent photosensitizing dye comprising a 3, 3' - diethylthiatricarbocyanine iodide solution disposed within said cavity,
    and means for exciting said dye to produce said coherent electromagnetic radiation, said means providing electromagnetic pulses having risetimes not exceeding a few times the decay time between the first excited singlet state and a triplet state of said dye.

14. The device of claim 13 wherein a solvent of said dye is any one of the group consisting of ethyl, methyl, propyl, or butyl alcohol.

15. The device of claim 13 wherein a solvent for said dye is dimethyl sulfoxide or dimethyl formamide.

16. The device of claim 13 wherein a solvent for said dye is ethylene glycol or glycerin.

17. A laser comprising an active medium in an optical cavity, said active medium consisting of a solution of the photosensitizing dye 3, 3' - diethylthiatricarbocyanine iodide in a transparent cylinder having two ends, and means for applying a lasing pulse at one end of said transparent cylinder for applying pumping energy to said active medium, said lasing pulse having a risetime less than a few times the mean decay time between the first excited singlet state and a triplet state of said active medium.

18. A laser comprising a solution of the photosensitizing dye 3, 3' - diethylthiatricarbocyanine iodide disposed in a first optical cavity comprising first and second parallel mirrors, a second optical cavity for producing a high energy output pulse having a risetime less than approximately a few times the decay time between the first excited singlet state and a triplet state of said active medium to pump said dye and lying coaxially of said first optical cavity, said first mirror being common to both optical cavities and being highly transmissive to said pumping energy but highly reflective of an output lasing pulse produced by said dye solution, and said second mirror being transmissive of the output lasing frequency of said dye solution.

19. A laser comprising an active medium comprising organic molecules having ground state energy levels and energy levels of a first excited singlet state and of a triplet state, said organic molecules being in a lasing condition when a sufficient threshold population inversion exists between said first excited singlet state and said ground state, there being decay transitions between said excited singlet state and said triplet state which deplete the population of said first excited singlet state reducing said population inversion;

a source of stimulating light for establishing said lasing condition in said molecules, said light having a risetime which is less than the time required for said decay transitions to reduce said population inversion below said sufficient population inversion.

20. A device for producing electromagnetic radiation comprising:

a fluorescent organic material disposed within said cavity having an allowed electric dipole fluorescent transition in which lasing can occur, said organic material having ground state energy levels and energy levels of a first excited singlet state and of a triplet state, there being decay transitions between said excited singlet state and said triplet state which populate said triplet state and destroy the probability of lasing in said allowed transition; and means for exciting said organic material to produce said coherent electromagnetic radiation in said allowed transition, said means producing electromagnetic radiation having a risetime which is less than the time required for said decay to destroy the probability of lasing in said allowed fluorescent transition.

21. The laser of claim 20, wherein said allowed electric dipole transition is a singlet-singlet fluorescent transition.

22. The laser of claim 20, further including a resonant cavity in which said fluorescent organic material is located.

23. A laser, comprising:

a fluorescent organic material having an allowed electric dipole fluorescent transition, said organic material having ground state energy levels and energy levels of a first excited singlet state and of a triplet state, said organic material being in a lasing condition when a sufficient population inversion exists between said first excited singlet state and said ground state, there being non-radiative decay transitions between said excited singlet state and said triplet state which deplete the population of said first excited singlet state and provide optical loss in said active medium, thereby tending to prevent said lasing;

a source of electromagnetic radiation for excitation of said fluorescent material to establish said lasing in said organic material, said electromagnetic radiation having a risetime which is less than the time required for said decay transitions to produce sufficient losses for prevention of said lasing between said excited singlet state and said ground state.

24. A coherent radiation device, comprising:

a fluorescent material having organic molecules capable of lasing in an allowed fluorescent transition when excited by energy which produces a critical population inversion in a singlet system of said fluorescent material said organic material having decay transitions which populate a triplet state of said organic molecules;

excitation means for exciting said fluorescent material with energy having a risetime sufficiently fast to produce said critical inversion, said risetime being less than the time required for gain in said singlet system to be nullified by losses resulting from accumulation of said molecules in said triplet state of said fluorescent material.

* * * * *